(12) United States Patent
Khan et al.

(10) Patent No.: US 7,729,432 B2
(45) Date of Patent: Jun. 1, 2010

(54) SYSTEM AND METHOD FOR ENHANCING THE PERFORMANCE OF WIRELESS COMMUNICATION SYSTEMS

(75) Inventors: Farooq Khan, Allen, TX (US); Cornelius Van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 11/551,910

(22) Filed: Oct. 23, 2006

(65) Prior Publication Data

US 2007/0098097 A1    May 3, 2007

Related U.S. Application Data

(60) Provisional application No. 60/730,982, filed on Oct. 28, 2005.

(51) Int. Cl.
*H04L 27/28*    (2006.01)
(52) U.S. Cl. ...................................................... 375/260
(58) Field of Classification Search .......... 375/259–260
See application file for complete search history.

(56) References Cited

U.S. PATENT DOCUMENTS

| | | | | |
|---|---|---|---|---|
| 2002/0154705 | A1* | 10/2002 | Walton et al. | 375/267 |
| 2004/0258146 | A1* | 12/2004 | Harikumar et al. | 375/232 |
| 2005/0159115 | A1* | 7/2005 | Sandhu | 455/101 |
| 2006/0013325 | A1* | 1/2006 | Agrawal et al. | 375/260 |

* cited by examiner

*Primary Examiner*—Kevin M Burd

(57) ABSTRACT

A system and method for enhancing the performance of a wireless communication system are disclosed. For example, a method for enhancing the performance of a wireless communication system is disclosed, which includes the steps of receiving a signal including a first plurality of sub-bands, calculating a plurality of channel quality values, each channel quality value associated with a respective sub-band of the first plurality of sub-bands, conveying the plurality of channel quality values to a processing unit associated with a transmitter unit that transmitted the signal, determining the highest channel quality value from the conveyed plurality of channel quality values, determining a cyclic delay value associated with the highest channel quality value, and applying the cyclic delay value to a second plurality of sub-bands.

25 Claims, 8 Drawing Sheets

SYSTEM AND METHOD FOR ENHANCING THE PERFORMANCE OF WIRELESS COMMUNICATION SYSTEMS

CROSS-REFERENCE TO RELATED APPLICATION AND CLAIM FOR PRIORITY

The present application is related to U.S. Provisional Patent Application No. 60/730,982, entitled "FREQUENCY-DOMAIN BEAMFORMING," filed on Oct. 28, 2005, which is assigned to the assignee of the present application. The subject matter disclosed in U.S. Provisional Patent Application No. 60/730,982 is incorporated by reference into the present application as if fully set forth herein. The present application hereby claims priority, under 35 U.S.C. §119(e), to U.S. Provisional Patent Application No. 60/730,982.

FIELD OF THE INVENTION

The invention relates to the telecommunications field, and more particularly, but not exclusively, to a system and method for enhancing the performance of wireless communication systems.

BACKGROUND OF THE INVENTION

Orthogonal Frequency Division Multiplexing (OFDM) is a spread spectrum modulation technique that distributes data for transmission over a large number of narrowband frequency units typically referred to as sub-carriers. The data in each sub-carrier is independently modulated with, for example, Quadrature Amplitude Modulation (QAM) or Phase-Shift Keying (PSK). Essentially, the number of sub-carriers is equal to the size, N, of the Inverse Fast Fourier Transformer/Fast Fourier Transformer (IFFT/FFT) used in OFDM transmitters and receivers.

The background of the invention may be described in the context of an OFDM-based wireless communication system. Essentially, data transmission and reception using OFDM begins with a serial-to-parallel conversion of QAM-modulated symbols (including data for transmission), which are input to an IFFT. At the output of the IFFT, N time-domain samples are obtained. The signal after the IFFT is parallel-to-serial converted, and a cyclic prefix (CP) is appended to the signal sequence. The resulting sequence of N samples (and CP) is referred to as an OFDM symbol. At an OFDM receiver, the CP is removed from the OFDM symbol, and the resulting signal is serial-to-parallel converted and input to an FFT. The output of the FFT is parallel-to-serial converted, and the resulting QAM-modulated signals are input to a QAM demodulator, which outputs baseband data.

In a wireless communication link, a multi-path channel experiences frequency-selective fading. Moreover, in a mobile wireless communication link, a multi-path channel also experiences time-varying fading. However, in a wireless mobile communication system using OFDMA, the system's overall performance and efficiency can be improved by using both time-domain and frequency-selective multi-user scheduling. Thus, by using frequency-domain scheduling for wireless transmissions, the capacity and reliability of the wireless channels can be improved. An approach that introduces frequency-selectivity into a wireless channel in an OFDM network is disclosed in commonly-assigned U.S. patent application Ser. No. 11/327,799 entitled "METHOD AND SYSTEM FOR INTRODUCING FREQUENCY SELECTIVITY INTO TRANSMISSIONS IN AN ORTHOGONAL FREQUENCY DIVISION MULTIPLEXING NETWORK," filed on Jan. 6, 2006. The subject matter disclosed in U.S. patent application Ser. No. 11/327,799 is incorporated by reference into the present application as if fully set forth herein.

If frequency-domain multi-user scheduling is used in a mobile wireless OFDM communication system, contiguous sets of sub-carriers are allocated for transmission to the mobile users. The total bandwidth of the system is divided into a plurality of sub-bands, and each sub-band includes a grouping of contiguous sub-carriers (e.g., $f_1$, $f_2$, $f_3$, $f_4$). Frequency-domain multi-user scheduling is generally beneficial for systems with low mobility users whose channel quality can be suitably tracked.

If it is desirable to achieve frequency-diversity in a mobile wireless OFDM communication system, the allocated sub-carriers in a band are uniformly distributed over the entire frequency spectrum. In a time-varying mobile wireless channel, the reliability of the transmission can be improved by coding the information over the sub-carriers. However, if the channel's response is flat, frequency diversity is difficult, if not impossible, to achieve. The channel quality of the high mobility users generally cannot be tracked (particularly in those systems where uplink and downlink fading occur independently) because of delays in reporting channel quality. Consequently, the use of frequency-diversity transmissions are preferred for high mobility users.

FIG. 1 depicts a block diagram of an existing OFDM wireless communication system 100, which illustrates a conventional technique used for transmitter antenna beam forming. In the transmitter subsystem 102 of system 100, an OFDM symbol (including N samples of data) 106 is coupled to a plurality of multipliers 108a through 108n (where n represents the $n^{th}$ or final multiplier). Also, beam-forming weights 110a through 110n ($g^0, g^1, \ldots, g^p$) are coupled to respective multipliers 108a through 108n. The (weighted) output of each multiplier 108a through 108n is coupled to a respective transmit antenna 112a through 112n, which transmit the n sub-bands including the OFDM symbol over a radio air interface or channel. An OFDM receiver subsystem 104 receives the n sub-bands in the channel, and outputs the OFDM symbol. Notably, receiver subsystem 104 estimates the complex gains $g^0, g^1, \ldots, g^p$ and couples them back to transmitter subsystem 102 via a feedback link 114. These estimated gains are used as the beam-forming weights 110a through 110n in transmitter subsystem 102. A significant problem with this approach is that the feedback information including the complex gains represents a substantial amount of resource overhead, which inefficiently consumes a significant amount of system resources and degrades the overall spectral efficiency of the system involved.

SUMMARY OF THE INVENTION

In one embodiment, the present invention provides a method for enhancing the performance of a wireless communication system. The method includes the steps of receiving a signal including a first plurality of sub-bands, calculating a plurality of channel quality values, each channel quality value associated with a respective sub-band of the first plurality of sub-bands, conveying the plurality of channel quality values to a processing unit associated with a transmitter unit that transmitted the signal, determining the highest channel quality value from the conveyed plurality of channel quality values, determining a cyclic delay value associated with the highest channel quality value, and applying the cyclic delay value to a second plurality of sub-bands.

In a second embodiment, the present invention provides a method for enhancing the performance of a wireless communication system. The method includes the steps of receiving a signal including a first plurality of sub-bands from a radio channel, calculating a plurality of channel quality values, each channel quality value associated with a respective sub-band of the first plurality of sub-bands, determining the highest channel quality value from the plurality of channel quality values, determining an identity for a sub-band associated with the highest channel quality value, conveying the identity and the highest channel quality value to a processing unit associated with a transmitter unit that transmitted the signal, determining a cyclic delay value associated with at least one of the identity and the highest channel quality value, and applying the cyclic delay value to a second plurality of sub-bands.

In a third embodiment, the present invention provides a method for enhancing the performance of a wireless communication system. The method includes the steps of receiving a signal including a first plurality of sub-bands from a radio channel, determining frequency-selectivity information for the radio channel, conveying the frequency-selectivity information to a transmitter unit that transmitted the signal, determining, from the frequency-selectivity information, if one or more cyclic delay values should be applied to a second plurality of sub-bands for transmission. If the one or more cyclic delay values should be applied, the method includes the steps of determining a plurality of levels of cyclic delay, each level of cyclic delay applied to a respective sub-band of the first plurality of sub-bands in the received signal, calculating a plurality of channel quality values based on the plurality of levels of cyclic delay applied to the first plurality of sub-bands, conveying the plurality of channel quality values to the transmitter unit that transmitted the signal, determining the highest channel quality value from the conveyed plurality of channel quality values, determining a cyclic delay value associated with the highest channel quality value, and applying the cyclic delay value associated with the highest channel quality value to the second plurality of sub-bands.

In a fourth embodiment, the present invention provides a system for enhancing the performance of a wireless communication system. The system includes a plurality of transmit antenna units, and means for inputting a cyclic delay value to at least one transmit antenna unit of the plurality of antenna units, the cyclic delay value associated with a quality condition of a radio channel.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
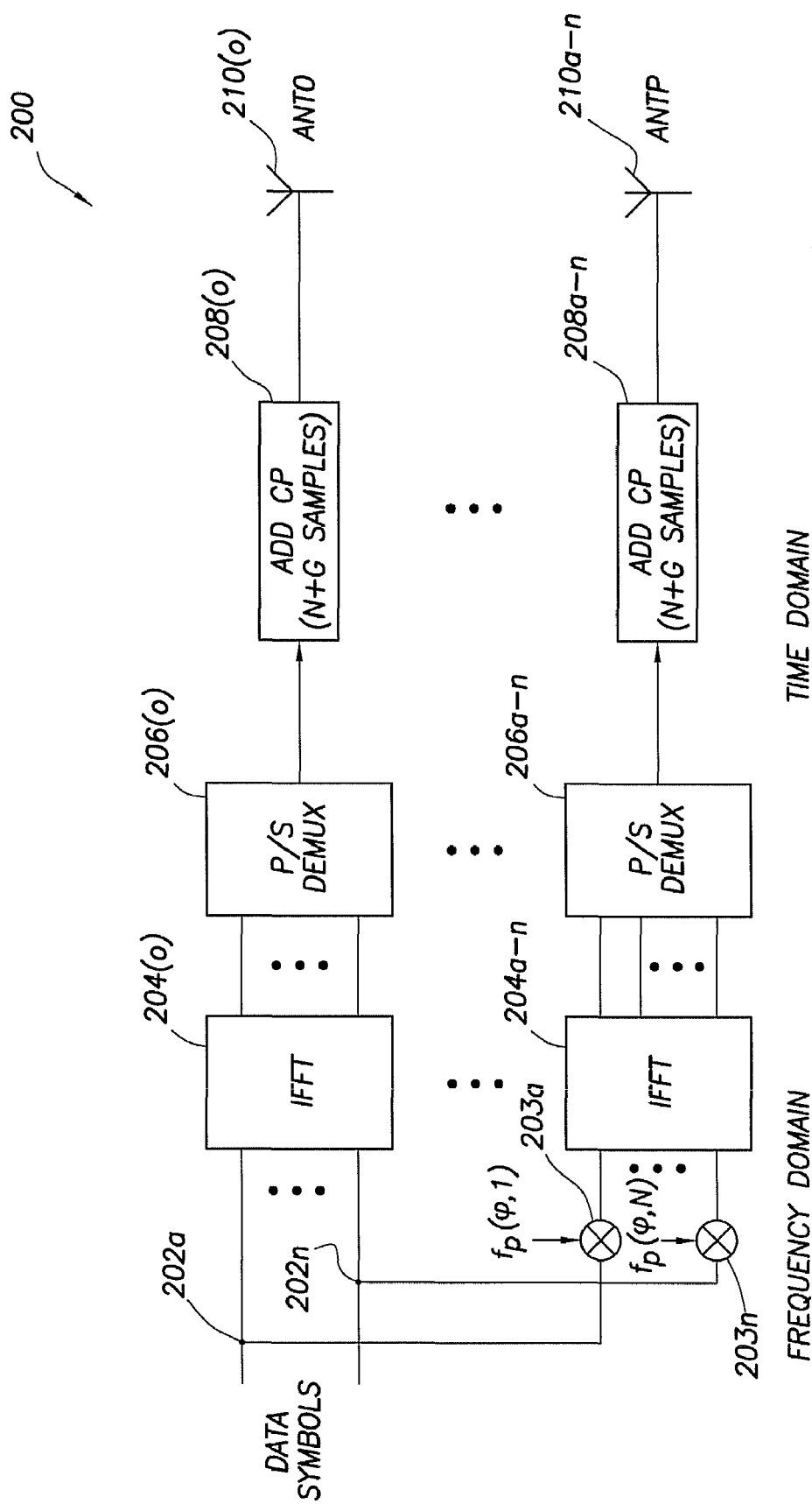
FIG. 2 depicts a block diagram of a system for transmitting data, which can be used to implement an example embodiment of the present invention.

With reference now to the figures, FIG. 2 depicts a block diagram of a system 200 for transmitting data, which can be used to implement an example embodiment of the present invention. Essentially, system 200 represents a transmitter portion of an OFDM wireless communication system in which the beam-forming weights for a sub-band can be determined at the transmitter side. The values of the beam-forming weights are estimated based on channel quality information or a Channel Quality Index (CQI) derived for the different sub-bands in the channel, along with information about the delays or phase rotations applied to those sub-bands. Consequently, the beam-forming weights for a sub-band do not have to be explicitly fed back from a receiver to the transmitter, which significantly reduces system resource usage and/or overhead.

For this example embodiment, system 200 implements an adaptive form of cyclic delay diversity (CDD) that can be used to inject frequency selectivity artificially into OFDM wireless communication systems. Different cyclic delay values are selected for different users and can depend on user-associated parameters such as, for example, a user's channel profile, velocity, acceleration, etc. For example, a relatively large cyclic delay value can be selected for a high speed mobile user that typically benefits from the use of frequency diversity, and a relatively small cyclic delay value can be selected for a low speed mobile user that typically benefits from the use of frequency-selective multi-user scheduling. Also, if a channel has a sufficiently high level of frequency-selectivity, a relatively small cyclic delay value can be selected for high rate-change (Doppler) mobile users with frequency-diversity mode transmissions.

Referring now to FIG. 2, an example embodiment of a frequency domain implementation of an adaptive CDD transmitter system 200 including P transmit antennas is shown. For this illustrative embodiment, a plurality of QAM modulated data symbols 202a through 202n are input in parallel to an Inverse Fast Fourier Transformer (IFFT) 204(0). The data symbols 202a through 202n are also coupled to a plurality of multipliers 203a through 203n (e.g., where "a" represents the first multiplier and "n" represents the $n^{th}$ or final multiplier). The output of each multiplier 203a through 203n is coupled to the respective inputs of a plurality of IFFTs 204a through 204n. Notably, for illustrative purposes and ease of understanding, only the final (nth) IFFT 204n of the plurality of IFFTs 204a through 204n is shown. At the output of each IFFT, N time-domain samples are obtained. For example, the N samples may represent one OFDM symbol to be transmitted by transmitter system 200. The parallel outputs of IFFT 204(0) are coupled to corresponding inputs of a parallel-to-serial demultiplexer 206(0), and the parallel outputs of IFFTs 204a through 204n are coupled to the corresponding inputs of a plurality of parallel-to-serial demultiplexers 206a through 206n.

The N samples (e.g., one symbol) to be transmitted are coupled from the outputs of demultiplexers 206(0) and 206a through 206n to the respective inputs of a plurality of add CP units 208(0) and 208a through 208n. Each add CP unit 208(0) and 208a through 208n appends a suitable CP of length G to the N samples in the symbol involved. The output of each add CP unit 208(0) and 208a through 208n is coupled to a respective transmit antenna 210(0) and 210a through 210n (Ant0, Ant1, . . . , AntP). For example, each of transmit antennas 210(0) and 210a through 210n can be a separate transmit antenna, or antennas 210(0) and 210a through 210n can compose one or more antenna subsystems using Multiple-Input Multiple-Output (MIMO) antenna technology.

Thus, for this example embodiment, system 200 is a transmitter subsystem that includes P transmit antennas (Ant0 . . . , AntP), the cyclic delay values introduced for Antenna 1 (210a), Antenna 2 (210b) through Antenna P (210n) for a user "m" are $D_{m1}$, $D_{m2}$ through $D_{mP}$, respectively, and these delays translate into corresponding phase functions $f_{m1}(\phi,k)$, $f_{m2}(\phi,k)$ and $f_{mP}(\phi,k)$, respectively. These phase functions, which are provided as inputs to multipliers 203a through 203n in the frequency domain, are typically implemented with (but not necessarily limited to) suitable linear functions such as:

$$f_p(\phi,k) = e^{j\phi ik},$$

$$\phi = 2\pi D_{mp}/N,$$

where N is the size of each IFFT, k is the index of the sub-carrier, and p is the antenna index. Note that a given delay results in a single phase function being applied over all of the sub-carriers involved. A non-delayed signal corresponding to a non-phase-shifted signal is transmitted from Antenna 0 210(0) in this case (e.g., $D_{m0}=0$).

Figure 1:
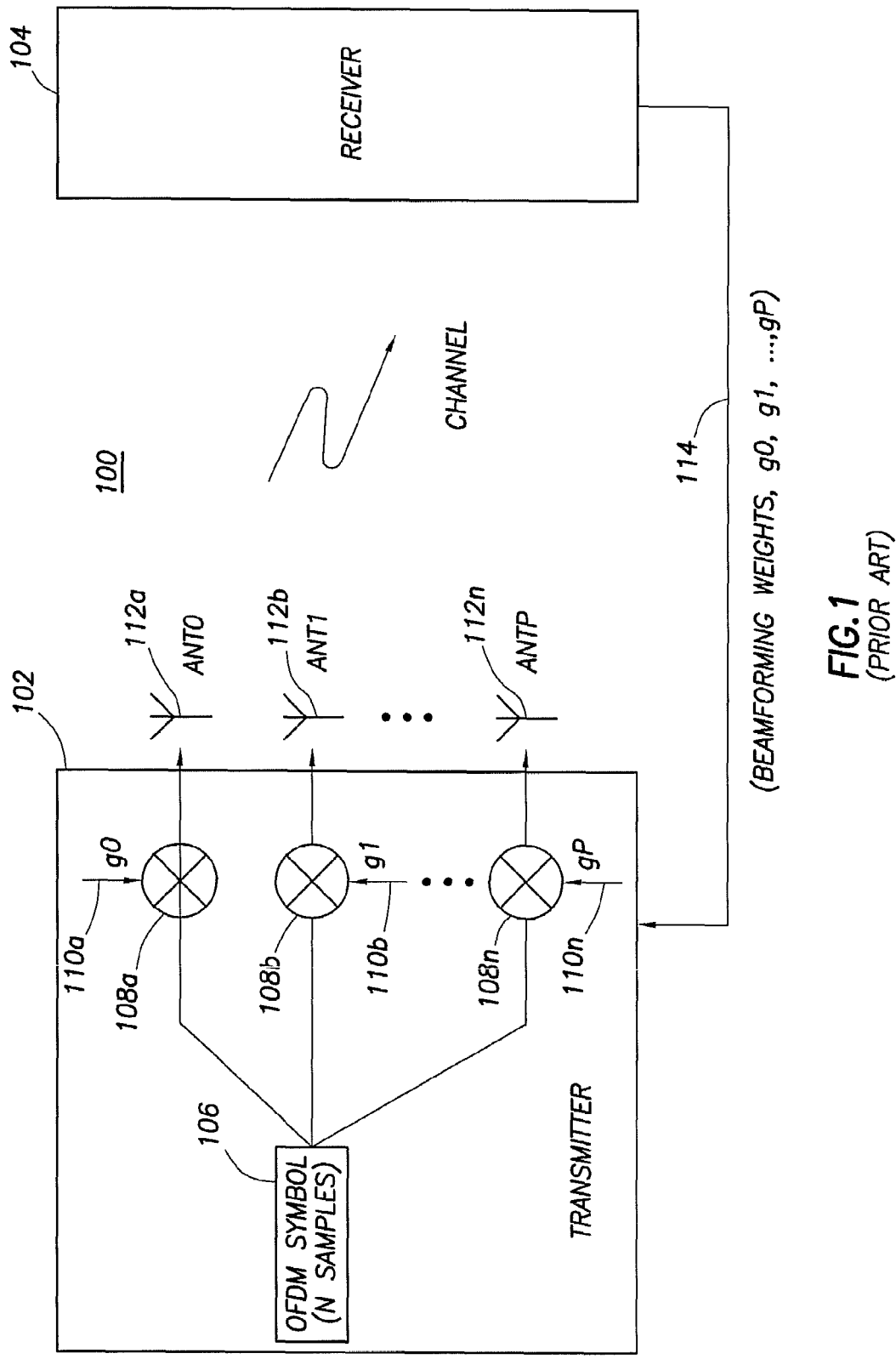
FIG. 1 depicts a block diagram of an existing OFDM wireless communication system, which illustrates a conventional technique used for transmitter antenna beam forming.

In a more general form of adaptive CDD, which illustrates a second example embodiment of the present invention (e.g., applying cyclic delays in the time-domain), different complex gains $g_0, g_1, \ldots, g_P$ can be applied to the signals (e.g., sub-bands) transmitted from the different antennas (Ant0, Ant1, . . . , AntP) shown in FIG. 1. In any event, in accordance with principles of the present invention, by transmitting the same OFDM symbol from the different antennas 210(0) and 210a through 210n and using the predetermined values of cyclic delay (in the frequency domain or time domain), system 200 artificially injects frequency-selective fading into the radio channel. This frequency-selectivity capability of system 200 can be exploited by using either frequency-selective multi-user scheduling for low to medium velocity mobile users, or frequency-diversity for the higher velocity mobile users.

In operation, system 200 transmits an OFDM symbol that appears to an OFDM receiver (not shown) to be a multi-path transmission from a single transmit antenna. For example, the OFDM receiver can be located in a wireless receiver, such as a mobile radiotelephone, mobile station (MS), cellular handset, mobile user, and the like. In this context, the composite channel response, $H_{mc}(k)$ on a sub-carrier k can then be expressed as:

$$H_{mc}(k) = H_{m0}(k) + H_{m1}(k) \cdot e^{-j2\pi k D_{m1}/N} + \ldots + H_{mP}(k) \cdot e^{-j2\pi k D_{mP}/N}$$

where $H_{mn}(k)$ is the channel response for a user m on antenna n, and k is the sub-carrier index. In this formulation, it may be assumed that all of the complex antenna gains ($g_0, g_1, \ldots g_P$) are unity.

Notably, in one example embodiment, system 200 can perform adaptive CDD directly in the frequency domain. For example, system 200 can apply a weight of $e^{-j2\pi k D_{mp}/N}$ to sub-carrier k transmitted from a plurality of antennas p for user m. The component $D_{mp}$ represents the value of cyclic delay imposed on antennas p for user m. Also, as described above, in a second example embodiment, adaptive CDD can be performed in the time-domain (e.g., by injecting suitable antenna gains).

Figure 3:
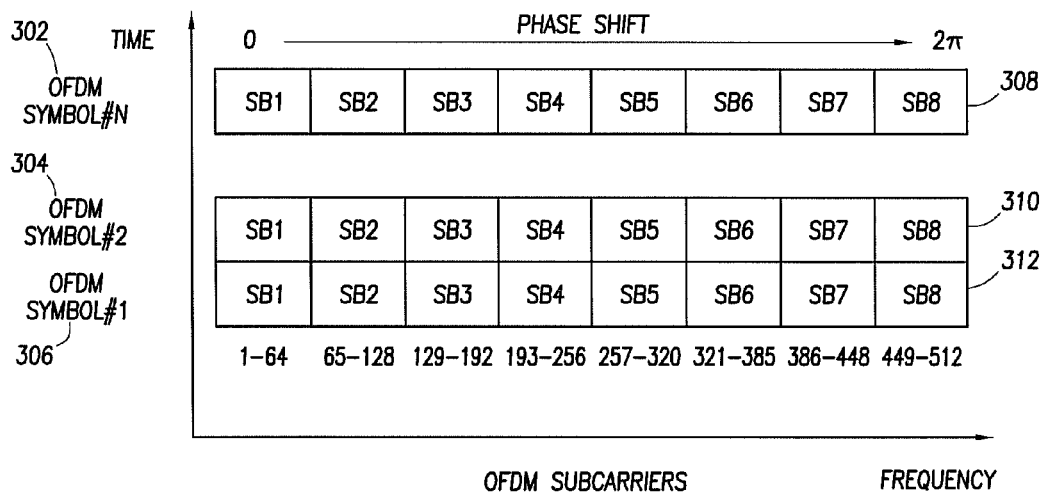
FIG. 3 depicts an example of resource partitioning in an OFDM communication system, which illustrates how the system shown in FIG. 2 can perform adaptive CDD in the frequency domain.

FIG. 3 depicts an example of resource partitioning in an OFDM communication system, which illustrates how system 200 (FIG. 2) can perform adaptive CDD in the frequency-domain. In this example, a plurality of example OFDM symbols 302, 304 and 306 is shown. Each symbol 302, 304, 306 is divided into eight groups of 64 sub-carriers for a total of 512 OFDM sub-carriers. Example sub-bands or groups of 64 sub-carriers for symbols 302, 304, 306 are indicated by the labels 308, 310, 312. Thus, system 200 can allocate one or more of these sub-bands (e.g., 308, 310, 312) to a given mobile user.

Figure 4:
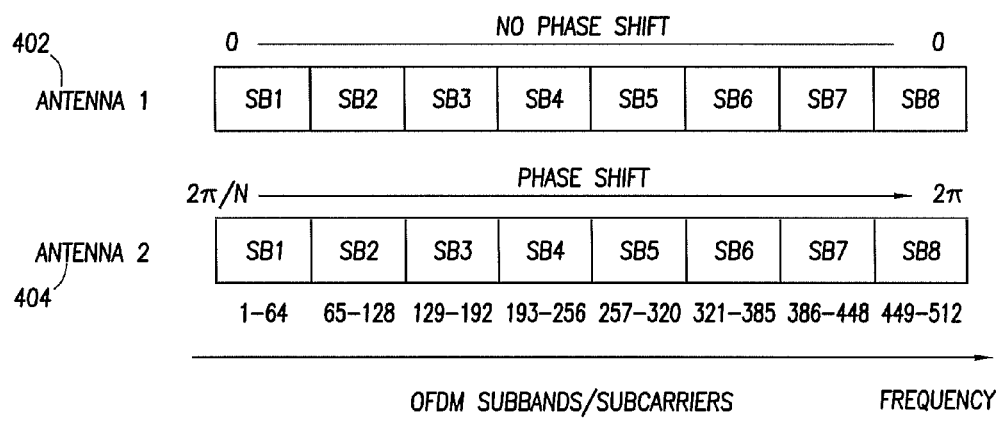
FIG. 4 depicts a second example of resource partitioning in an OFDM communication system, which illustrates further how the system shown in FIG. 2 can perform adaptive CDD in the frequency domain.

FIG. 4 depicts a second example of resource partitioning in an OFDM communication system, which illustrates further how system 200 (FIG. 2) can perform adaptive CDD in the frequency domain. In this example, system 200 applies no phase shift to the sub-carriers from antenna 402, and a delay period of one sample is applied to phase-shift the sub-carriers transmitted from antenna 404. For example, second antenna 404 may represent antenna 210n in FIG. 2. Introducing a one sample delay results in a weight of $e^{-j2\pi k/N}$ being applied to the $k^{th}$ sub-carrier. Specifically, system 200 applies a phase shift of $2\pi/N$ and $2\pi$, respectively, to the first sub-carrier and last sub-carrier of the OFDM symbol transmitted from second antenna 404. Notably, the phase shift applied to a sub-carrier from antenna 404 increases linearly with the sub-carrier index. Also, note that the complete cycle of phase shifts from $2\pi/N$ to $2\pi$ occurs over the entire bandwidth, and the phase shift from one sub-carrier to the next occurs in increments of $2\pi/N$. Furthermore, note that the phase shift applied to the sub-bands transmitted from second antenna 404 occurs in increments of $2\pi M/N$, where M is the number of sub-carriers within a sub-band. Thus, in the case where system 200 introduces a cyclic delay of D samples, the D cycles of phase shift from $2\pi/N$ to $2\pi$ occur over the entire bandwidth of the channel involved.

Figure 5:
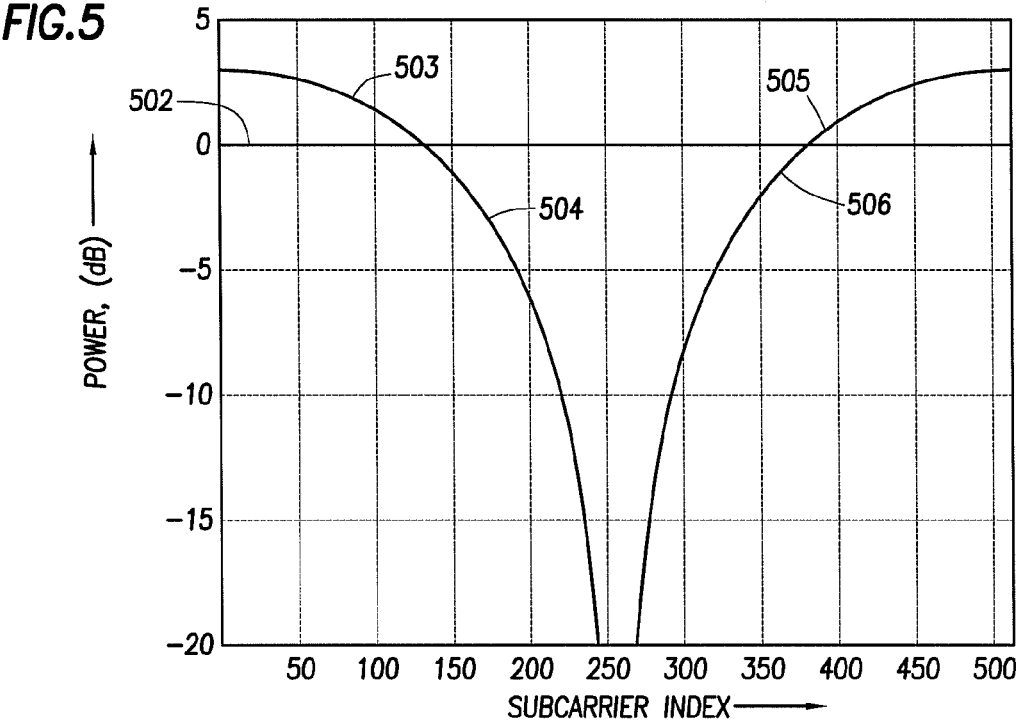
FIG. 5 is a graph depicting an example frequency spectrum of a signal transmission from a second antenna (e.g., antenna 210a in FIG. 2) of an OFDM transmitter, which illustrates the effects of a phase shift with a one sample delay being applied to the transmitted sub-carriers using adaptive CDD.

FIG. 5 is a graph depicting an example frequency spectrum of a signal transmission from a second antenna (e.g., antenna 210n in FIG. 2) of an OFDM transmitter, which illustrates the effects of a phase shift associated with a one sample delay being applied to the transmitted sub-carriers using adaptive CDD. The straight line 502 at 0 dB denotes the flat-frequency spectrum for a single-path channel. When a delayed signal is transmitted from the second antenna (e.g., 210n), this signal appears at a receiver as a second multi-path component, which introduces frequency-selectivity to the channel. Note that certain of the sub-carriers from the second antenna experience constructive fading (e.g., indicated by the curved line segments 503 and 505 above 0 dB), and the remaining sub-carriers from the second antenna experience destructive fading (e.g., indicated by the curved line segments 504 and 506 below 0 dB). In this particular illustrative example, applying a phase shift of $2\pi/N$ or $2\pi$ to the transmitted sub-carriers results in the maximum signal level being received at an OFDM receiver.

In an OFDM-based mobile communication system (e.g., system 200 in FIG. 2) using frequency-selective multi-user scheduling, a Base Station (BS) uses information about the channel quality being experienced by different users on the OFDM bands for access scheduling purposes. The mobile receivers feed back their respective channel quality information data to the BS. In the example configuration depicted in FIG. 3, the channel quality information for sub-bands 1 through 8 can be used to schedule up to eight users simultaneously.

Figure 6:
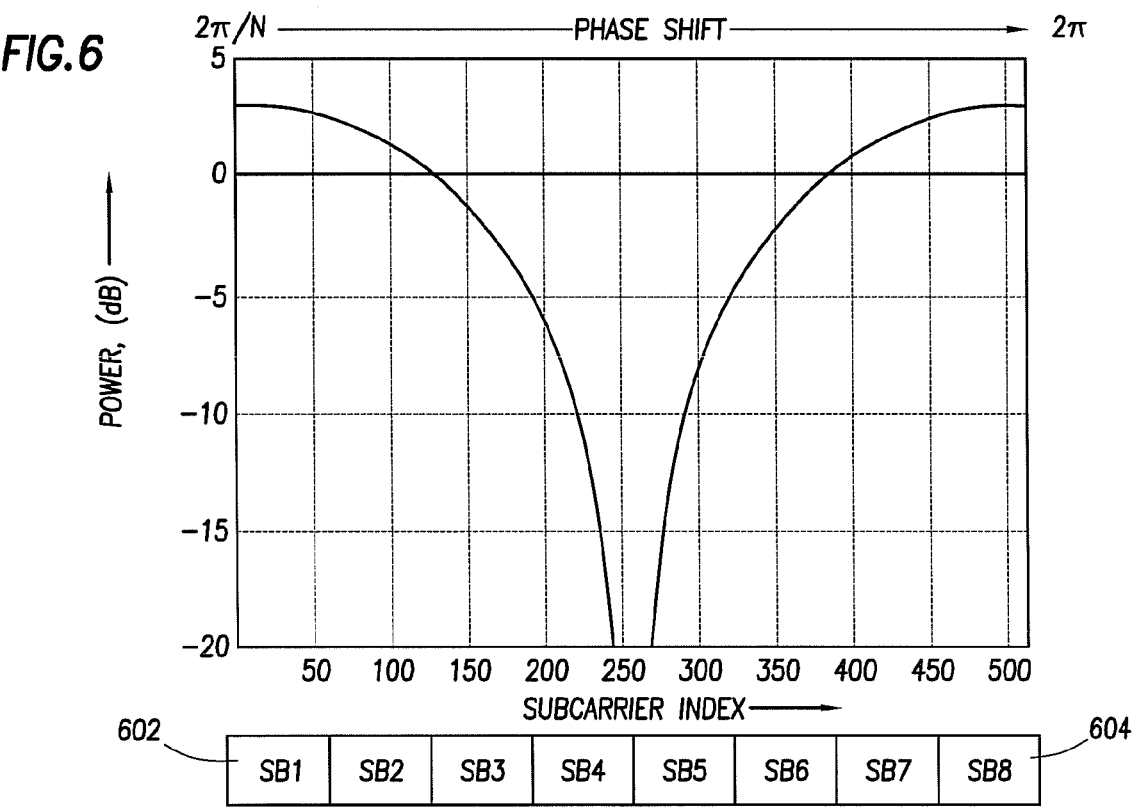
FIG. 6 is a graph depicting an example frequency spectrum of a signal transmission from an antenna (e.g., antenna 210a in FIG. 2) of an OFDM transmitter, which shows signal levels on different sub-bands using adaptive CDD.

In accordance with teachings of the present invention, an OFDM transmitter (e.g., the example transmitter system depicted in FIG. 2) can use the channel quality feedback information available for the different sub-bands, in order to determine the weights to be applied to different sub-carriers or sub-bands for transmission. For example, FIG. 6 is a graph depicting an example frequency spectrum of a signal transmission from an antenna (e.g., antenna 210n in FIG. 2) of an OFDM transmitter, which shows signal levels on different sub-bands using adaptive CDD. In this example, note that the signal levels for sub-bands 1 and 8 (602, 604) are maximum, and these sub-bands are experiencing the highest levels of channel quality. In addition to this type of channel quality information, the phase rotation values to be applied to the different sub-bands are predetermined and known at the transmitter side. Consequently, at the transmitter side of an OFDM system using adaptive CDD, the information about channel quality and/or signal strength on the different sub-bands can be used, along with predetermined phase rotation information for the different sub-bands or sub-carriers, to select suitable weights, delays or phase rotations to be applied to the sub-carriers from a second (or subsequent) antenna. As illustrated by the example of FIG. 6, an OFDM transmitter (e.g., system 200) can use the same weight, delay or phase rotation value used on the sub-band (602 or 604) having the highest channel quality, on all of the transmitted sub-bands. Consequently, all of the transmitted sub-bands will experience constructive fading, which improves the overall level and quality of the signal at the receiver. This improvement in the quality of the received signal translates into a significantly higher level of data throughput for the mobile users involved.

Figure 7:
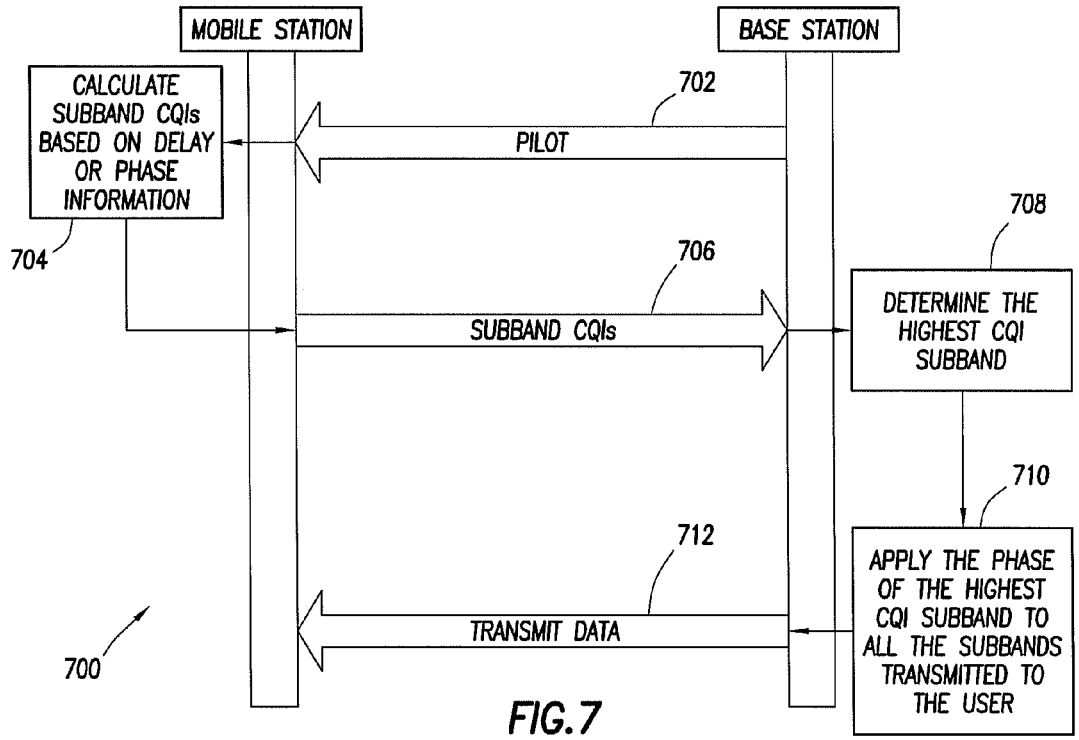
FIG. 7 depicts a sequence diagram that illustrates a method for transmitting data using adaptive CDD, in accordance with an example embodiment of the present invention.

FIG. 7 depicts a sequence diagram that illustrates a method 700 for transmitting data using adaptive CDD, in accordance with an example embodiment of the present invention. For clarity only, one mobile station (MS) and one BS are shown. For this illustrative embodiment, the BS transmits a pilot or reference signal (step 702). Next, a processor in the MS calculates a Channel Quality Index (CQI) value for each of the sub-bands received from the BS (step 704). Notably, the terms channel quality information and Channel Quality Index may be used interchangeably, because channel quality information and the term CQI both refer to channel condition information. For example, a CQI value equal to zero (e.g., CQI=0) means that the channel's condition or quality is bad, and this value corresponds to the worst channel condition possible in this context. A CQI value equal to 15 (e.g., CQI=15) means that the channel's condition or quality is good, and this value corresponds to the best channel condition possible.

In order to calculate CQIs for the sub-bands, in addition to using channel quality information, the processor in the MS can use the delay or phase rotation value that is applied by the BS' transmitter to each of the sub-bands involved. The BS can provide the delay or phase rotation information to the MS using one or more suitable signaling messages. Next, the MS sends the calculated CQI data for each of the sub-bands to the BS (step 706). For example, the MS can convey the calculated CQI data to the BS using a suitable signaling message. Next, using the CQI data received from the MS, the BS identifies the sub-band associated with the highest channel quality or CQI value, and determines the delay or phase rotation value applied to that sub-band (step 708). The BS applies the delay or phase rotation value of that sub-band to all of the sub-bands to be transmitted to that MS (step 710). The BS then transmits the data (e.g., OFDM symbol) over all of the sub-bands (step 712).

Generally, it may be assumed that a higher CQI or channel quality value for a sub-band indicates that the signals from the multiple antennas transmitting on this sub-band are being constructively added. Also, in the case of a flat fading channel, if the same delay or phase rotation as that applied to the sub-band experiencing the highest CQI value is applied to the other sub-bands, the CQI values, channel qualities and signal levels for those other sub-bands can be significantly increased. Consequently, in the case of a flat fading channel, finding a relatively high CQI value for a particular sub-band indicates that the delay or phase rotation value being applied to this sub-band also can be used to improve the CQI values and channel quality of the other transmissions to the MS that reported that high CQI value.

In those cases where a BS is applying different linearly-increasing phase rotations to sub-carriers within a sub-band, which can result from a delayed signal transmission from a second antenna (e.g., Ant1) or subsequent antenna, an MS can use the phase values of the sub-carriers within a sub-band to calculate a CQI. In a flat fading channel, the BS can then apply the delay or phase rotation value for the sub-band having the highest CQI to all of the sub-bands for transmission to that particular MS. Importantly, note that phase rotation values or weights to be applied to a BS transmitter's antenna are determined implicitly based on the CQI feedback in a flat fading channel. Therefore, contrary to the conventional closed loop beam-forming approaches, the present method provides an advantageous beam-forming approach in which there is no need to feedback explicit beam-forming weights from a receiver to a transmitter.

Figure 8:
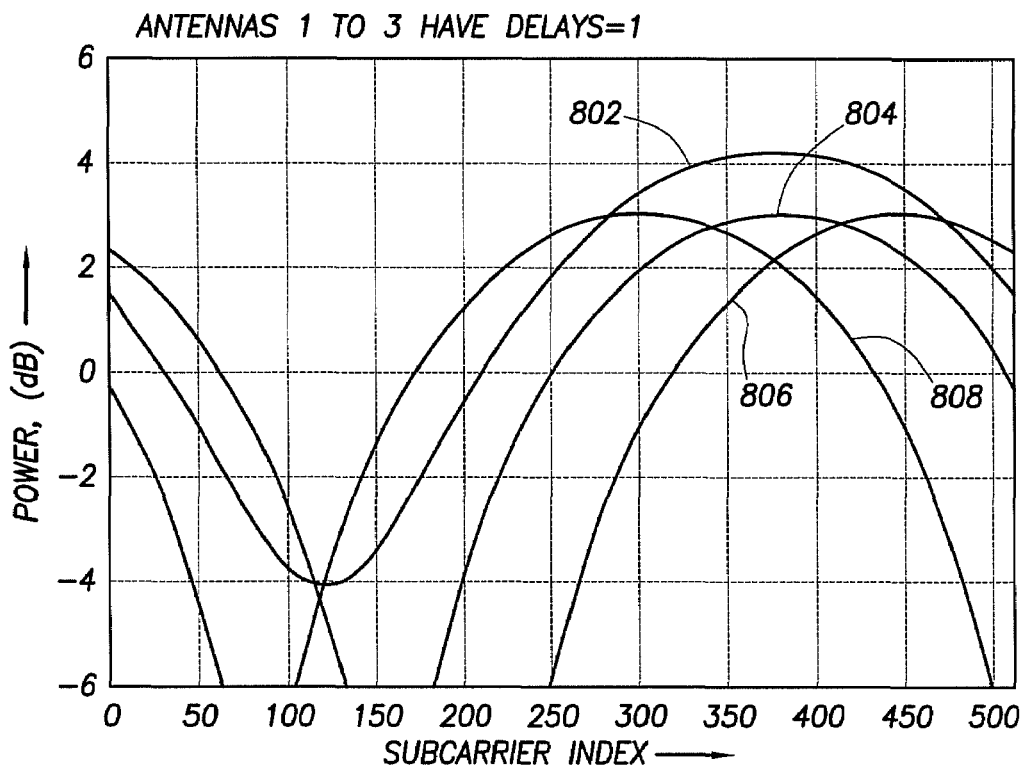
FIG. 8 is a graph depicting the expected gain of a four-antenna OFDM transmitter system (as compared with a single antenna system) using adaptive CDD, which illustrates certain advantages of the method shown in FIG. 7.

FIG. 8 is a graph depicting the expected gain of a four-antenna OFDM transmitter system (as compared with a single antenna system) using adaptive CDD, which illustrates certain advantages of method 700 (FIG. 7). In this case, assume that an OFDM transmitter (e.g., system 200 in FIG. 2) using adaptive CDD includes four transmit antennas 0 through 3 (e.g., antenna 210(0) is antenna 0, and antenna 210n is antenna 3), and the system has applied a delay of one sample to each of antennas 1 through 3 (e.g., antennas 210a through 210c). For this example, also assume that the maximum gain theoretically possible is 6 dB. The curved line 808 represents the user equipment-(UE-) measured channel quality values for the signals from the four transmit antennas. The curved line 802 represents the UE-measured signal from antennas 0 and 1 (e.g., antennas 210(0), 210a), curved line 804 represents the UE-measured signal from antennas 0 and 2 (e.g., antennas 210(0), 210b), and curved line 806 represents the UE-measured signal from antennas 0 and 3 (e.g., antennas 210(0), 210c).

Figure 9:
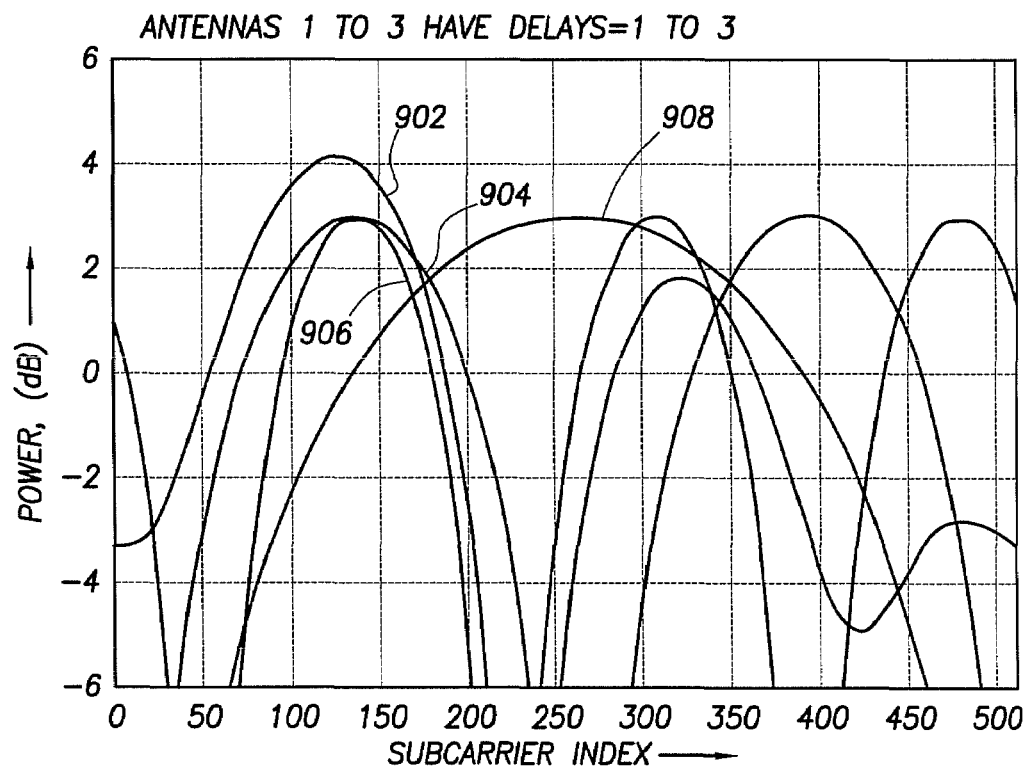
FIG. 9 is a second graph depicting the expected gain of a four-antenna OFDM transmitter system using adaptive CDD, which again illustrates certain advantages of the method shown in FIG. 7.

FIG. 9 is a second graph depicting the expected gain of a four-antenna OFDM transmitter system using adaptive CDD, which again illustrates certain advantages of method 700. However, in this case, assume that an OFDM transmitter (e.g., system 200 in FIG. 2) using adaptive CDD includes four transmit antennas 0 through 3 (e.g., antenna 0 is antenna 210(0) and antenna 210n is antenna 3), but the system has applied a delay of one sample to three samples, respectively, to antennas 1 through 3 (e.g., antennas 210a through 210c). Again, for this example, the maximum gain theoretically possible is 6 dB. The curved line 908 represents the user equipment-(UE-) measured channel quality values for the signals from the four transmit antennas. The curved line 902 represents a UE-measured signal from antennas 0 and 1 (e.g., antennas 210(0), 210a), curved line 904 represents a UE-measured signal from antennas 0 and 2 (e.g., antennas 210(0), 210b), and curved line 906 represents a UE-measured signal from antennas 0 and 3 (e.g., antennas 210(0), 210c).

As illustrated by the example measurements shown in FIGS. 8 and 9, the present method may or may not provide the full gain of 6 dB theoretically expected from an ideal closed-loop beam-forming approach where multiple antennas are used. However, the example measurements shown in FIGS. 8 and 9 demonstrate that because a single index value (e.g., CQI value) can be fed back to a transmitter for beam-forming purposes instead of feeding back a plurality of explicit beam-forming weights, the present method provides an acceptable trade-off between feedback overhead and gain. As a practical matter, it is important to note that the conventional UEs (e.g., MSs) typically can feed back only a single CQI that corresponds to the composite signal received. However, this lack of capability is a design limitation of the conventional UEs and signaling message protocols, and does not limit the scope of coverage of the present method.

Figure 10:
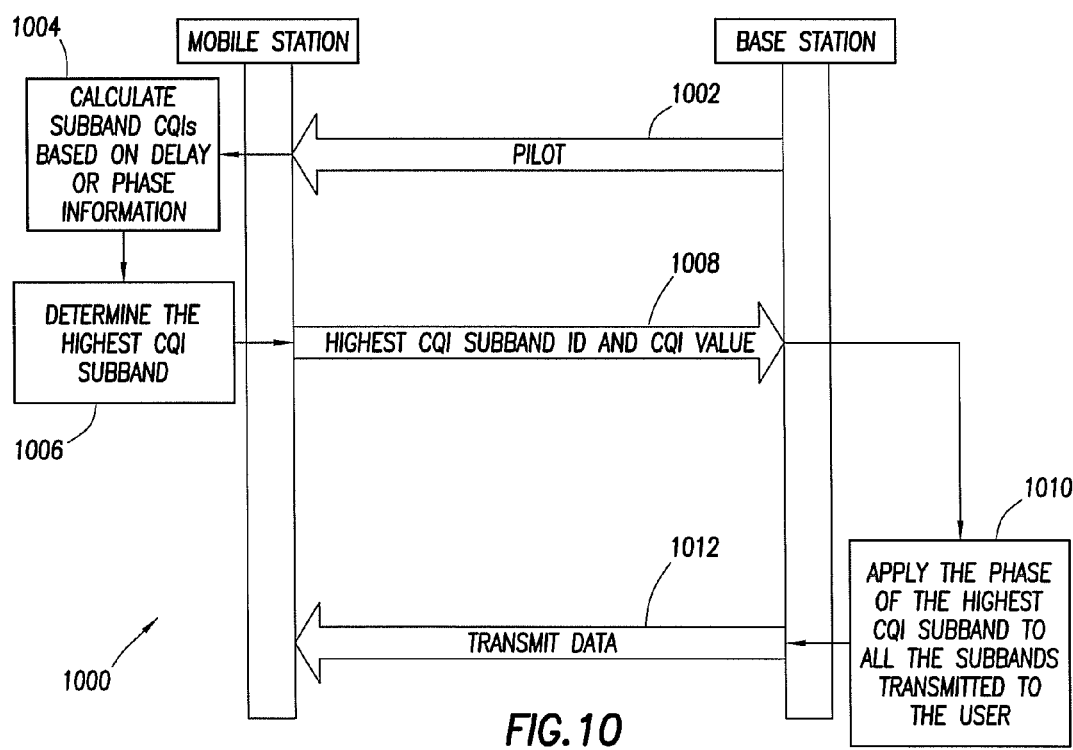
FIG. 10 depicts a sequence diagram that illustrates a method for transmitting data using adaptive CDD, in accordance with a second example embodiment of the present invention.

FIG. 10 depicts a sequence diagram that illustrates a method 1000 for transmitting data using adaptive CDD, in accordance with a second example embodiment of the present invention. Again, for clarity only, one mobile station MS and one BS are shown. For this illustrative embodiment, the BS transmits a pilot or reference signal (step 1002). Next, a processor in the MS calculates a CQI value for each of the sub-bands received from the BS (step 1004). In order to calculate the CQIs for the sub-bands, the processor uses the delay or phase rotation information that is applied by the BS' transmitter to each of the sub-bands involved. The BS can provide such delay or phase information to the MS using one or more suitable signaling messages. Next, the processor in the MS identifies the sub-band having the highest channel quality or CQI value (step 1006). The MS then sends to the BS a message including the calculated CQI value for the sub-band having the highest channel quality, along with the identity of that sub-band (step 1008). For example, the MS can transmit the calculated CQI data and sub-band identity information to the BS using one or more suitable signaling messages. Next, using the CQI data and sub-band identity information received from the MS, the BS determines the delay or phase rotation value applied to this identified sub-band, and applies that delay or phase rotation value to all of the sub-bands to be transmitted to that MS (step 1010). The BS then transmits the data (e.g., OFDM symbol) over all of the sub-bands (step 1012). Note that, in this embodiment, method 1000 enables the MS to determine the identity of the highest CQI sub-band and convey that identity along with the corresponding CQI value to the BS.

Figure 11:
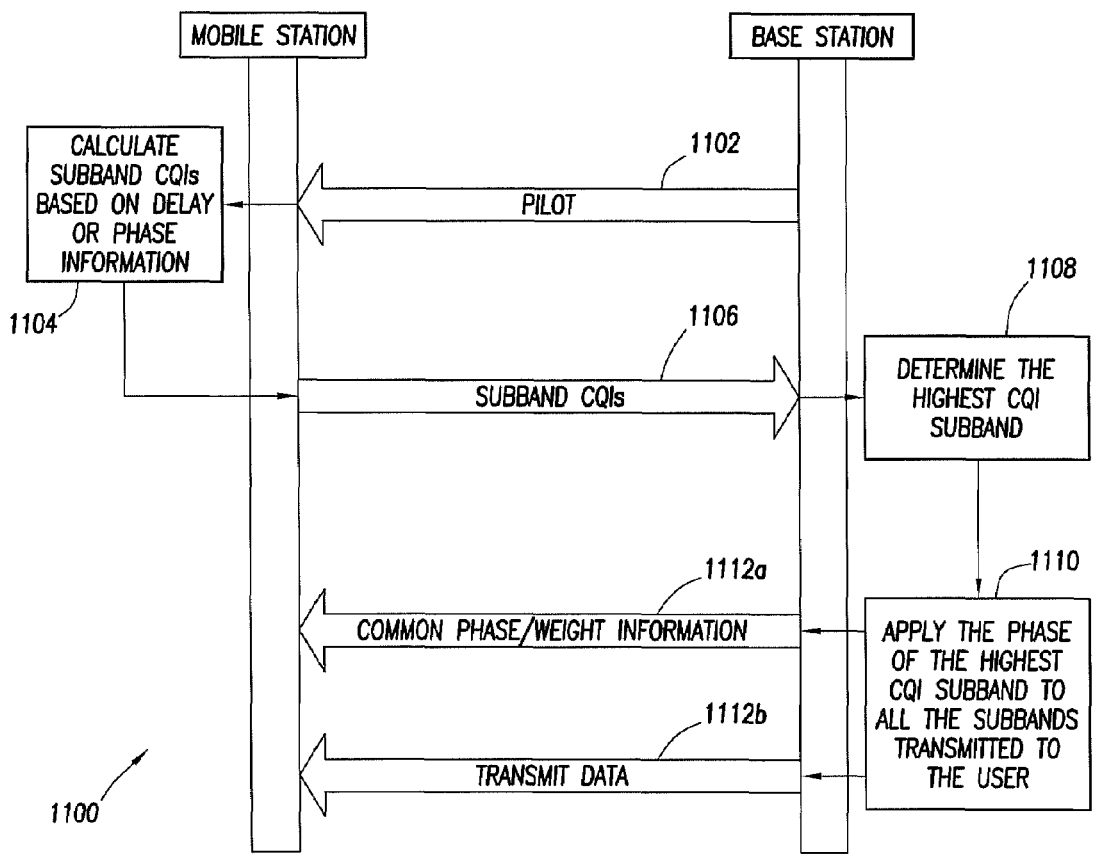
FIG. 11 depicts a sequence diagram that illustrates a method for transmitting data, in accordance with a third example embodiment of the present invention.

FIG. 11 depicts a sequence diagram that illustrates a method 1100 for transmitting data, in accordance with a third example embodiment of the present invention. Again for clarity only, one MS and one BS are shown. For this illustrative embodiment, the BS transmits a pilot or reference signal (step 1102). Next, a processor in the MS calculates a CQI value for each of the sub-bands received from the BS (step 1104). In order to calculate the CQIs for the sub-bands, the processor uses the delay or phase rotation information that is applied by the BS' transmitter to each of the sub-bands involved. The BS can provide such delay or phase information to the MS using one or more suitable signaling messages. Next, the MS sends the calculated CQI data for each of the sub-bands to the BS (step 1106). For example, the MS can transmit the calculated CQI data to the BS using one or more suitable signaling messages. Next, using the CQI data received from the MS, the BS identifies the sub-band having the highest channel quality or CQI value, and determines the delay or phase rotation value applied to this sub-band (step 1108). The BS applies the delay or phase rotation value of the sub-band having the highest identified CQI to all of the sub-bands to be transmitted to that MS (step 1110). The BS then transmits the data (e.g., OFDM symbol) over all of the sub-bands (step 1112b).

Notably, for this example embodiment, the BS also forwards to the MS (e.g., in a suitable signaling message) information about the weight or phase value that is being applied to the sub-bands (step 1112a). The receiver in the MS can use this information to derive the composite channel estimate from the orthogonal pilot signals being transmitted from the transmitter's multiple antennas. In this example, it may be assumed that the pilot or reference signals being transmitted from the MS are not delayed or phase rotated. Generally, a user (MS) knows the highest CQI value it has reported to the BS. Therefore, in this case, the user also knows the amount of delay or phase rotation to be expected on the sub-bands being received. However, in those instances where CQI estimation errors or feedback errors have occurred, the transmitter may be applying certain weights or phase rotation values to the sub-bands, but these weight or phase rotation values may not be expected by the receiver. In this example embodiment, by enabling the transmitter to provide to the receiver an explicit indication of the weights or phase rotation values being applied to the sub-bands, the present method enhances channel estimation and data decoding at the receiver side.

Figure 12:
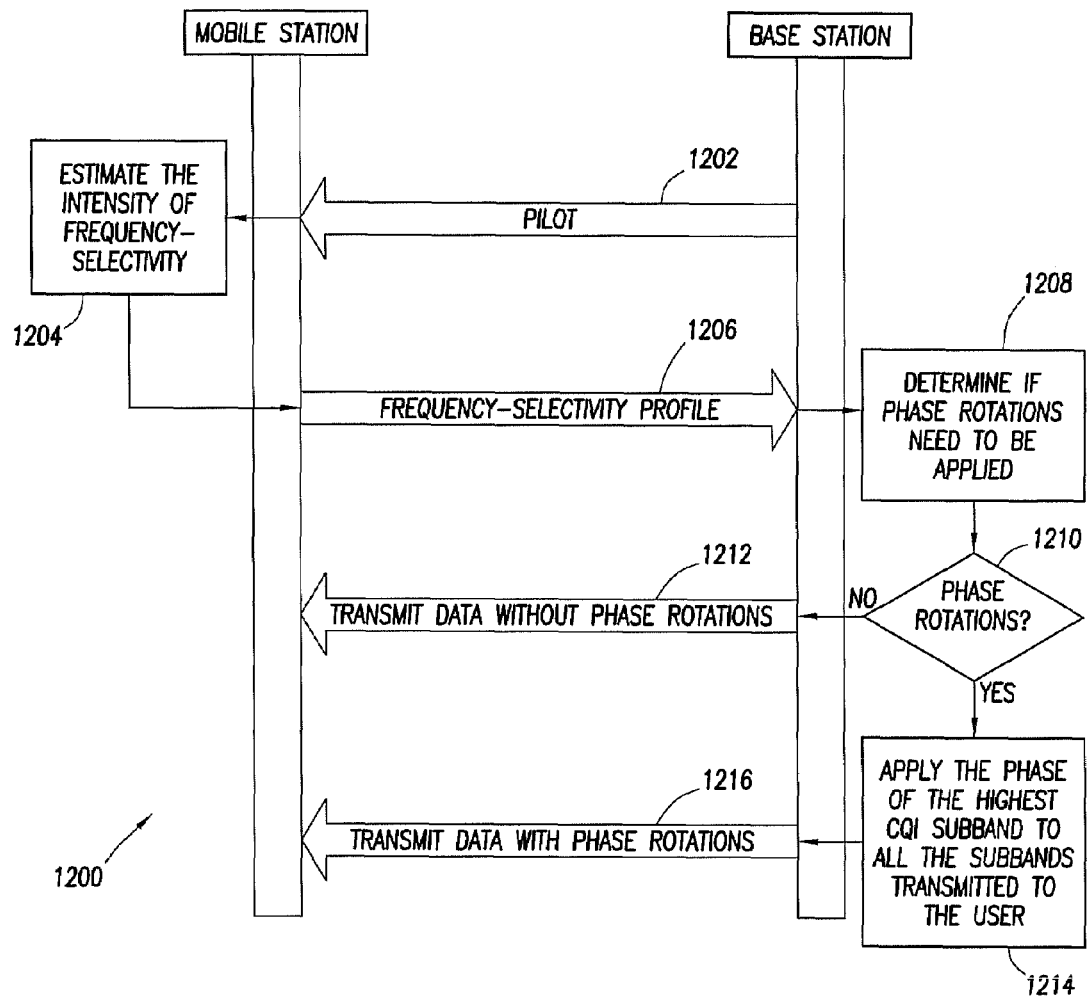
FIG. 12 depicts a sequence diagram that illustrates a method for transmitting data, in accordance with a fourth example embodiment of the present invention.

FIG. 12 depicts a sequence diagram that illustrates a method 1200 for transmitting data, in accordance with a fourth example embodiment of the present invention. Again for clarity only, one MS and one BS are shown. For this illustrative embodiment, the BS transmits a pilot or reference signal (step 1202). Next, a processor in the MS estimates the intensity of the frequency-selectivity in the channel and formulates a frequency-selectivity profile (step 1204). For example, the processor in the MS can associate a relatively high number of multi-paths in the channel with a relatively high level of frequency-selectivity. The MS then sends the frequency-selectivity profile information for that channel to the BS (step 1206). For example, the MS can send the frequency-selectivity profile data to the BS in one or more suitable signaling messages.

Note for this example embodiment, that the delays, phase rotation values or weights for the sub-bands from the second and subsequent transmit antennas (e.g., antennas other than Ant0) are applied only for flat-fading or lightly frequency-selective channels. In those cases where the multi-path channels are highly frequency-selective, the up-fades and down-fades in the frequency domain occur because the multi-path signal components are being constructively and destructively added. Consequently, in those cases, applying phase rotations to the sub-carriers transmitted from the second and subsequent antennas may not provide any significant improvement over non-delayed sub-carriers. Therefore, the present method also provides an advantageous approach that enables a BS (or, for example, another component on the transmitter side) to determinate whether or not to apply a delay or phase rotation value to the sub-bands for transmission.

For this example embodiment, returning to method 1200, using the frequency-selectivity profile information derived for the channel, the BS determines whether or not any delays or phase rotations should be applied to the sub-bands at the transmit antennas (step 1208). If the BS determines that the frequency-selectivity of the channel is relatively high (step 1210), then the BS can decide not to apply a delay or phase rotation to the sub-bands at the transmit antennas, and transmit data (e.g., OFDM symbol) on those sub-bands without delays or phase rotations (step 1212). However, if (at step 1210) the BS determines that the frequency-selectivity of the channel is not particularly high, then the BS can determine the delay or phase rotation value for the sub-band having the highest CQI value, and apply that delay or phase rotation value to all of the sub-bands to be transmitted (step 1214). The BS then transmits data (e.g., OFDM symbol) on the sub-bands with the delays or phase rotations (step 1216).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for enhancing the performance of a wireless communication system, the method comprising the steps of:
   receiving a signal including a first plurality of sub-bands;
   calculating a plurality of channel quality values, each channel quality value associated with a respective sub-band of the first plurality of sub-bands;
   conveying the plurality of channel quality values to a processing unit associated with a transmitter unit that transmitted the signal;
   determining the highest channel quality value from the conveyed plurality of channel quality values;
   determining a cyclic delay value associated with the highest channel quality value; and
   applying the cyclic delay value to a second plurality of sub-bands.

2. The method of claim 1, wherein the cyclic delay value is a phase function value.

3. The method of claim 1, wherein the cyclic delay value is a phase rotation value.

4. The method of claim 1, wherein the cyclic delay value is a phase shift value.

5. The method of claim 1, wherein the cyclic delay value is a gain value in the time domain.

6. The method of claim 1, wherein the receiving step is performed by a receiver at a mobile station, and the steps of determining the highest channel quality value and determining the cyclic delay value are performed by a processor associated with a transmitter unit at a base station.

7. The method of claim 1, further comprising the step of transmitting data on the second plurality of sub-bands.

8. The method of claim 1, further comprising the steps of:
   transmitting data on the second plurality of sub-bands; and
   transmitting information associated with the cyclic delay value.

9. The method of claim 1, wherein the signal is at least one of a pilot signal and a reference signal.

10. The method of claim 1, wherein the method implements a form of adaptive cyclic delay diversity.

11. The method of claim 1, wherein the wireless communication system is an OFDM system.

12. A method for enhancing the performance of a wireless communication system, the method comprising the steps of:
    receiving a signal including a first plurality of sub-bands from a radio channel;
    calculating a plurality of channel quality values, each channel quality value associated with a respective sub-band of the first plurality of sub-bands;
    determining the highest channel quality value from the plurality of channel quality values;
    determining an identity for a sub-band associated with the highest channel quality value;
    conveying the identity and the highest channel quality value to a processing unit associated with a transmitter unit that transmitted the signal;
    determining a cyclic delay value associated with at least one of the identity and the highest channel quality value; and
    applying the cyclic delay value to a second plurality of sub-bands.

13. The method of claim 12, wherein the steps of determining the cyclic delay value associated with the identity or the highest channel quality value, and applying the cyclic delay value to a second plurality of sub-bands are performed by a processing unit associated with a transmitter unit in a base station.

14. A method for enhancing the performance of a wireless communication system, the method comprising the steps of:
    receiving a signal including a first plurality of sub-bands from a radio channel;
    determining frequency-selectivity information for the radio channel;
    conveying the frequency-selectivity information to a transmitter unit that transmitted the signal;
    determining, from the frequency-selectivity information, if one or more cyclic delay values should be applied to a second plurality of sub-bands for transmission; and
    if the one or more cyclic delay values should be applied:
    determining a plurality of levels of cyclic delay, each level of cyclic delay applied to a respective sub-band of the first plurality of sub-bands in the received signal;
    calculating a plurality of channel quality values based on the plurality of levels of cyclic delay applied to the first plurality of sub-bands;
    conveying the plurality of channel quality values to the transmitter unit that transmitted the signal;
    determining the highest channel quality value from the conveyed plurality of channel quality values;
    determining a cyclic delay value associated with the highest channel quality value; and applying the cyclic delay value associated with the highest channel quality value to the second plurality of sub-bands.

15. The method of claim 14, wherein the step of determining frequency selectivity information comprises estimating a number of multi-paths in the radio channel.

16. A system for enhancing the performance of a wireless communication system, comprising:
a plurality of transmit antenna units; and
means for inputting a cyclic delay value to a first transmit antenna unit of the plurality of antenna units, the cyclic delay value being based at least partly upon a quality condition on a plurality of sub-bands associated with a second transmit antenna unit of the plurality of antenna units.

17. The system of claim 16, wherein the means for inputting a cyclic delay value comprises at least one multiplier unit.

18. The system of claim 16, wherein the means for inputting a cyclic delay value comprises:
at least one multiplier unit;
at least one inverse fast fourier transformer unit coupled to the at least one multiplier unit;
at least one parallel-to-serial demultiplexer unit coupled to the at least one inverse fast fourier transformer unit; and
at least one cyclic prefix adder unit coupled between the at least one transmit antenna unit and the at least one parallel-to-serial demultiplexer unit.

19. The system of claim 16, wherein the means for inputting a cyclic delay value further comprises a plurality of multiplier units, wherein at least one multiplier unit of the plurality of multiplier units is configured to multiply an OFDM symbol and a predetermined phase function value.

20. The system of claim 16, wherein the means for inputting a cyclic delay value is configured to apply at least one of a predetermined phase function value, a predetermined phase rotation value, and a predetermined phase shift value to an OFDM symbol.

21. The system of claim 16, wherein the means for inputting a cyclic delay value further comprises:
a plurality of cyclic prefix adder units connected to the plurality of transmit antenna units, and each cyclic prefix adder unit is configured to add at least one prefix sample of length G to a plurality of symbol samples of length N.

22. The system of claim 16, wherein the system is a transmitter subsystem for the wireless communication system.

23. The system of claim 16, wherein the wireless communication system is a mobile wireless communication system configured to use Orthogonal Frequency Division Multiplexing.

24. The system of claim 16, wherein the system is a transmitter subsystem adapted to use an adaptive form of cyclic delay diversity.

25. The system of claim 16, wherein the plurality of transmit antenna units comprise at least one Multiple-Input Multiple-Output antenna system.

* * * * *